July 20, 1937.  E. H. J. C. GILLETT  2,087,643
AUTOMOBILE TRANSMISSION AND CONTROL SYSTEM
Filed Jan. 12, 1933  4 Sheets-Sheet 2
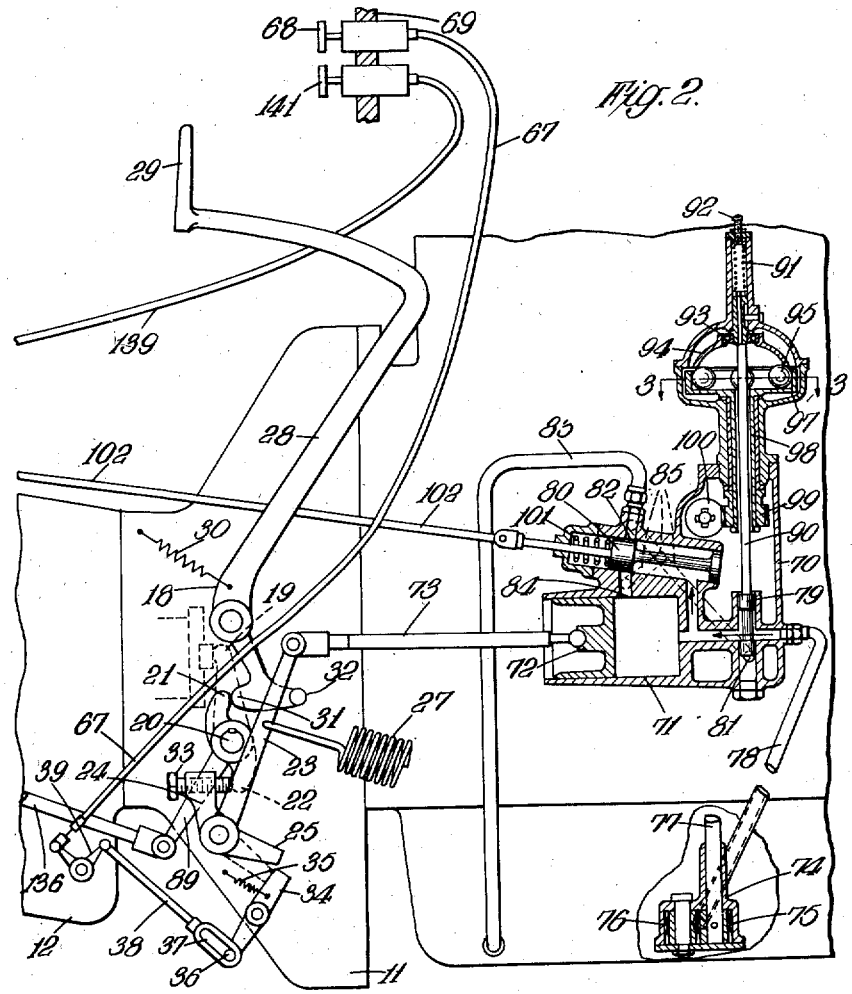
Inventor
E. H. J. C. Gillett
by Wilkinson & Mawhinney
Attorneys

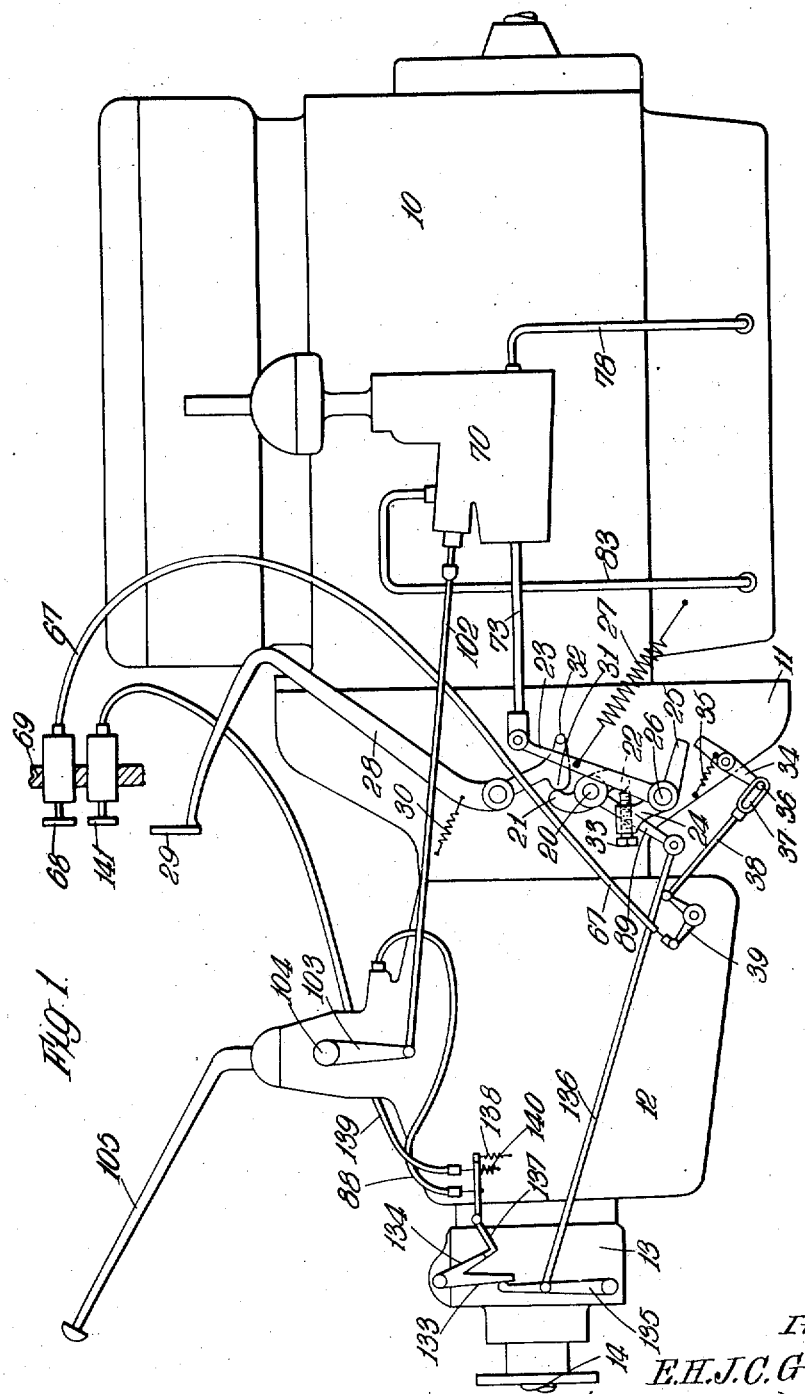

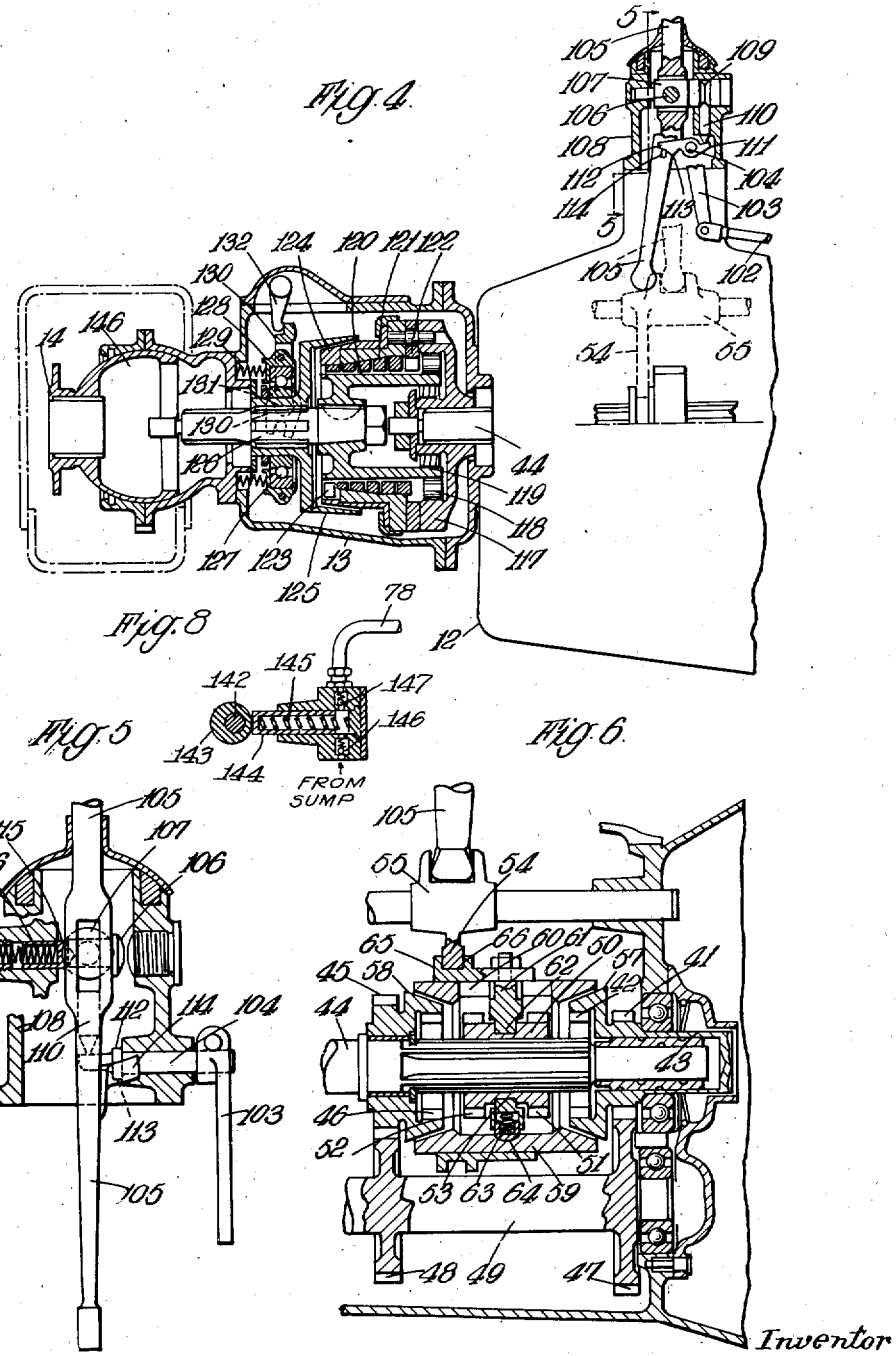

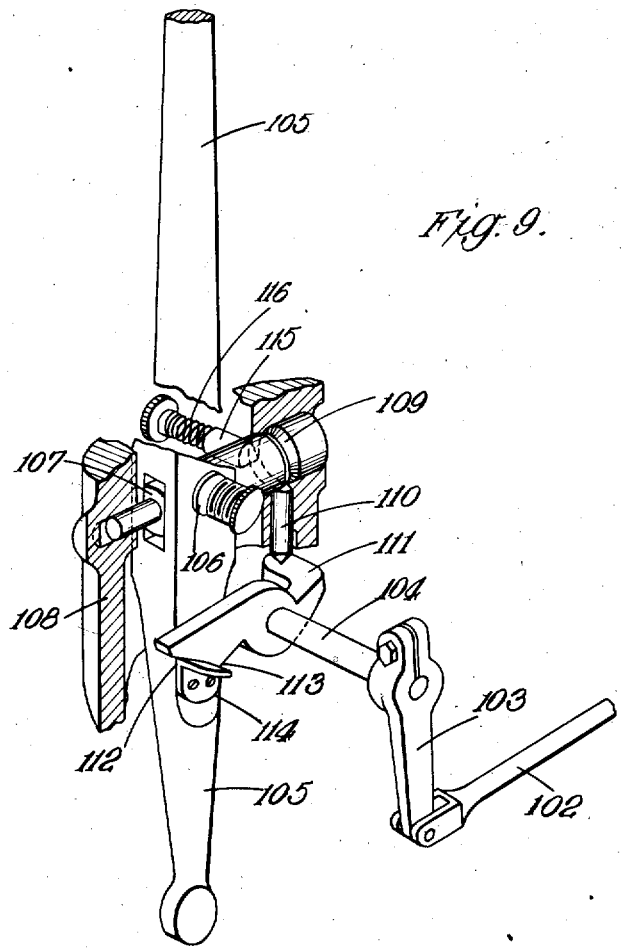

Patented July 20, 1937

2,087,643

UNITED STATES PATENT OFFICE 2,087,643

AUTOMOBILE TRANSMISSION AND CONTROL SYSTEM

Edward Henry James Cecil Gillett, West Hampstead, London, England

Application January 12, 1933, Serial No. 651,437
In Great Britain January 14, 1932

29 Claims. (Cl. 192—3.5)

The present invention relates to automobile transmission and control systems and has particular reference to improvements in the operation of transmission clutches.

The invention has as its general object the simplification of the driving of the vehicle and in particular to eliminate the necessity for the exercise of special skill on the part of the driver both in starting the vehicle from rest and in changing gear.

The said simplification of driving is accomplished in the present invention by suppressing the functions of the usual clutch pedal. To this end power means are provided for operating the clutch, said power means being controllable by the engine or manually. In this way the usual clutch pedal may be entirely dispensed with; but it is preferably retained and means provided for selectively suppressing the action of the clutch-operating power means so that the control of the clutch may be carried out either automatically or in the normal manner by direct foot operation at the option of the driver.

The provision for optional reversion to the normal control of the clutch is of advantage for the purpose of parking the vehicle and manoeuvring in confined spaces since it permits of slipping the clutch to any desired extent.

The control of the power means for clutch operation by the motor is preferably effected through the agency of centrifugally acting means so that the clutch is automatically disengaged when the speed of the motor falls below a predetermined number of revolutions per minute. This ensures an easy start of the vehicle from rest, the clutch being automatically engaged when the motor is accelerated from its idling speed, the engagement of the clutch being positively but smoothly and progressively effected as hereinafter more fully described.

In order to facilitate gear changing the manual control of the clutch-operating power means is preferably effected in conjunction with the gear shifting operation. To this end an interconnection is provided between the gear shift lever and the controlling means of the clutch-operating power means. The arrangement is such that the main clutch is automatically disengaged while the change of gear is being effected, re-engagement of the clutch at the conclusion of the gear shifting operation being automatic.

In order to ensure easy and certain changes of gear the variable speed gear may be of a silent engaging type, such for example as epicyclic gearing controlled by brake bands or gearing of the kind embodying in itself synchronizing means.

Alternatively the present invention includes the provision of means for isolating the variable speed gear, such means consisting in particular of a unidirectional coupling mounted on the driven shaft of the variable speed gear.

The said unidirectional coupling constitutes a free-wheel drive and in order to render free-wheeling selective at the option of the driver locking means are preferably provided for rendering the said unidirectional coupling bidirectional at will.

Provision is also made for operating the locking means of the unidirectional coupling concurrently with the operation of the main clutch so that when the driver's control for selective free-wheeling is in the "fixed" position, the unidirectional coupling is nevertheless temporarily unlocked to allow overrun of the driven road wheels whenever the main clutch is disengaged, thereby allowing of easy gear-changing. In order to prevent the transmission of shocks to the unidirectional coupling the driver's control for locking the same is preferably made preselective, the locking only becoming effective concurrently with re-engagement of the main clutch after a preliminary disengagement thereof.

The invention consists in the novel features and combinations as above set forth and as hereinafter more fully disclosed in and by the following description, with reference to the accompanying drawings of a constructional embodiment of the invention, and as defined in the claims, which drawings and claims form part of the present specification.

In the drawings:—

Fig. 1 is a general view in side elevation of the power unit of a motor vehicle including the motor, clutch, variable speed gear and an isolating coupling at the end of the variable gear remote from the engine, together with the control means for the various parts.

Fig. 2 shows the forward part of Fig. 1 to a larger scale, the power device for operating the clutch being shown in vertical longitudinal section.

Fig. 2ᵃ is a diagrammatic showing of the essential parts of the clutch.

Fig. 3 illustrates a detail of the power device as viewed in section along the line 3—3 of Fig. 2.

Fig. 4 is a view on a larger scale and partly sectioned of the rear part of Fig. 1.

Fig. 5 illustrates a detail of the showing of

Fig. 4 as viewed in an irregular section taken generally along the line 5—5 of Fig. 4.

Fig. 6 illustrates a modification employing a variable speed gear with automatic synchronizing means, said speed gear being viewed in longitudinal vertical section.

Fig. 7 illustrates in longitudinal vertical section an alternative form of pump for feeding the power device more particularly shown in Fig. 2.

Figure 8 shows the pump of Figure 7 in plan section.

Fig. 9 is an isometric view partly in section showing details of Figs. 4 and 5.

Referring to Figs. 1 to 5:—

The power unit of the vehicle includes a motor 10, a clutch casing 11, a variable speed gear housing 12 and a housing 13 containing an isolating coupling arranged between the variable speed gear and the propeller shaft 14 which drives the road wheels.

The housing 11 contains a main friction clutch, the construction of which may follow any of the forms usual in automobile engineering practice. For the sake of clearness, however, the essential parts of the clutch are illustrated in a highly diagrammatic form in Fig. 2ᵃ in which a driving member 16 is shown as mounted on the motor crank shaft 15 and a driven member 17 is mounted in slidable driving relation with a driven shaft 43 and is biased to engagement with the driving member 16 by a spring 86 which seats on a fixed abutment 87. Disengagement of the driven clutch member 17 from the driving member 16 is effected by means of a withdrawal race 18 and a striking fork 19 which are also shown in Fig. 2.

The striking fork 19 is mounted on a cross shaft 20 which carries externally to the casing 11 a cam having two lobes 21, 22, the lower lobe of which is engageable by an adjustable screw stud 33 carried by the arm 24 of a three-armed lever 23, 24, 25 pivoted externally to the casing 11 and to whose arm 23 is secured a strong tension spring 27 anchored to a suitable fixed part of the vehicle, such as for example as the motor crank case as shown in Fig. 1. The spring 27 normally acts to disengage the clutch by the pressure of the stud 33 on the cam lobe 22 which rocks the striking fork 19 in the clutch disengaging direction, the spring 27 being sufficiently powerful to overcome the clutch engaging spring 86. The clutch is also disengageable by means of a pedal 29 mounted on the end of a lever 28, the lower part of which carries a projection 31 engaging the upper cam lobe 21, to effect disengagement of the clutch. A light spring 30 is provided for biasing the pedal lever 28 to clutch engaging position. The lower part of the lever 28 also carries a projecting pin 32 which engages the lever arm 23 when the pedal is fully depressed, for a purpose hereinafter described.

The end of the lever 23 is coupled to a rod 73 actuated by a power device generally indicated at 70 in Fig. 1 which is operative to move the rod 73 to the left in Figs. 1 and 2 to overcome the tension of the spring 27 and rock the lever 23, 24, 25 in an anti-clockwise direction, which permits the engagement of the clutch 16, 17 by the spring 86 by withdrawing the stud 33 and allowing the cam 21, 22, the shaft 20 and the striking fork 19 to rock in a clockwise direction.

In order to compensate for wear in the various parts and to ensure that the clutch engaging spring 86 is freed from counter pressure when the clutch is fully engaged, the stud 33 may be adjusted so that when the rod 73 is at the end of its clutch engaging travel there is a small clearance between the stud 33 and the cam lobe 22.

When the rod 73 is in clutch engaging position disengagement of the clutch may still be effected by means of the pedal 29, the cam lobe 22 moving away from the stud 33.

In order to suppress the action of the power device to enable the clutch to be operated directly by the pedal in the usual way, means are provided for locking the lever 23, 24, 25 in clutch engaging position. These means comprise a pawl 34 arranged to engage the lever arm 25 in the clutch engaging position and prevent its return to the clutch disengaging position under the action of the spring 27.

The pawl 34 is biased by a light spring 35 to the position for engaging the lever arm 25 by moving under it. The lower end of the pawl 34 carries a pin 36 engaged in a slot 37 at the end of a rod 38 which is actuated through a bell crank 39 by a flexible cable means 67 controllable by a knob 68 mounted on the dash board 69.

In the position shown in Figs. 1 and 2 the knob 68 is pushed in and the pin 36 is engaged by the end of the slot 37 to rock the pawl 34 so as to clear the end of the lever arm 25. On pulling out the knob 68 the bell crank 39 is rocked in a clockwise direction, thus freeing the pawl 34 for movement into position for engaging the lever arm 25. If the latter is in the clutch disengaging position, the pawl 34 is blocked against movement but on bringing the lever 23, 24, 25 into clutch engaging position the pawl 34 is freed for movement under the action of its bias spring 35 so as to engage the end of the lever arm 25 and prevent the return of the lever 23, 24, 25 to clutch disengaging position. The action of the knob control 68 is thus preselective and becomes effective on bringing the lever 23, 24, 25 into clutch engaging position, such preselective action being made possible by the pin and slot connection 36, 37.

This arrangement enabling the clutch to be operated by the pedal in the usual way is of great use in parking the vehicle and manoeuvring it in confined spaces, since it permits slipping of the clutch to any extent desired by the driver, for which power operation of the clutch by the device 70 is not suitable. Since the power device 70 is inoperative when the engine is not running and the clutch is then normally disengaged by the spring 27 independent means are provided for bringing the lever 23, 24, 25 into clutch engaging position. This means comprises the pin 32 mounted on the lower end of the pedal lever 28. On fully depressing the latter the pin 32 engages the lever arm 23 to rock the same in an anti-clockwise direction, at the same time extending the spring 27 and permitting the pawl 34 to clear the arm 25 and move into position to engage the latter and lock the lever 23, 24, 25 in clutch engaging position.

In this way it is possible for the driver to engage the clutch with the motor not running when the vehicle has been left standing with the lever 23, 24, 25 in the clutch disengaging position, the operation being to pull out the knob 68, depress the pedal 29 to its fullest extent and release it again. This is particularly useful in enabling the motor to be started by pushing the vehicle, or for restarting the motor after any voluntary stall by means of the inertia of the momentum of the vehicle.

The power means for clutch operation generally illustrated at 70 in Fig. 1 is shown in section in Fig. 2. The power means 70 comprises a cylinder 71 in which is slidable a piston 72 coupled to the rod 73. The working space of the cylinder 71 is supplied by a pump 74 having a pair of inter-meshing gear wheels 75, 76 of which the former is mounted on a shaft 77 permanently driven by the motor through drive means (not illustrated) which may be of any convenient kind. The pump 74 draws oil from the motor sump and may conveniently serve for supplying the motor lubrication system as well as the power means 70. The delivery of the pump 74 to the power means is by means of a pipe 78 and is controlled by a pair of valves 79, 80 arranged to open or close by-pass ports 81, 82 respectively. When both these ports are closed by their respective valves 79, 80 (as shown in Fig. 2) the oil is delivered to the cylinder 71 and builds up pressure behind the piston 72, forcing the latter into the position shown in Fig. 2 and thereby rocking the lever 23, 24, 25 into clutch engaging position. When the piston 72 has reached the end of its travel as shown in Fig. 2 it uncovers a port 84 in the side of the cylinder 71 through which the excess oil delivery is passed to the pipe 83 and thence to the sump. Pipes 85 connect the ports 81, 84 with the pipe 83.

When either of the valves 79, 80 is moved to a position for opening its respective port 81, 82 the oil delivery from the pipe 78 is delivered direct to the sump through the pipe 83, thus releasing the pressure behind the piston 72, whereupon the spring 27 returns the lever 23, 24, 25 to clutch disengaging position, thereby disengaging the clutch.

The valve 79 is mounted on the end of a vertical rod 90, the upper end of which is pressed downwards by a spring 91 to urge the valve 79 into position for opening the port 81. The rod 90 carries by means of a bearing 93 an inverted cup-shaped member 94 engaged by a plurality of balls 95 carried in diametrical slots 96 formed in a dished member 97 (see Fig. 3). The member 97 is mounted on a sleeve 98 surrounding the rod 90 and carries at its lower end a gear 99 meshing with a gear 100 driven by the motor through any convenient drive means.

The centrifugal force exercised by the balls 95 owing to their rotation causes them to press on the underside of the member 94 thereby forcing it and with it the valve rod 90 upwards against the spring 91. The upward movement of the rod 90 and valve 79 thus depends on the speed of the member 97 and when this speed exceeds a certain value the rod 79 will be lifted far enough to close the port 81 and apply pressure to the piston 72. The speed at which this occurs may be regulated by adjusting the pressure of the spring 91 for which purpose an adjustable screw abutment 92 is provided. Since it is desirable to set the valve 79 to close the port 81 at a fairly low speed of motor revolution it is desirable to limit the load imposed on the members 94, 90 etc. by the balls 95 at high rates of revolution.

This is automatically provided for in that when the member 94 is raised sufficiently to close the port 81 the balls 95 come in contact with the rim of the dished member 97 which resists any excess of centrifugal force developed by the balls at high rates of revolution.

By the above described centrifugal governor means smooth engagement of the clutch when starting from rest is assured since with the engine idling the port 81 is open and the power device inoperative. On speeding the engine up above a speed selectable by the adjustment of the screw abutment 92 the power device is brought into operation and oil pressure is steadily accumulated behind the piston 72 and the force of the spring 27 gradually overcome to permit progressive engagement of the clutch. Since increase of pressure behind the piston 72 depends on the delivery of the pump 74 the more quickly the engine is speeded up the faster will be the rate at which the clutch is engaged.

In Fig. 7 and Figure 8 an alternative form of pump is illustrated. In this case a motor driven shaft 142 carries a cam 143 which actuates a reciprocating plunger 144 which is held up against the cam by a spring 145. The plunger 144 draws oil from the engine sump and delivers it to the pipe 78, the suction and delivery ports of the pump being controlled by suitable non-return valves 146, 147. With this type of pump the delivery is directly proportional to its speed of operation and is independent of the temperature and viscosity of the oil, so that the rate of engagement of the clutch which is directly proportional to the rate of delivery of oil to the cylinder 71 is also directly proportional to the speed of the motor, so that with the form of pump illustrated in Fig. 7 the rate of clutch engagement is independent of the temperature and viscosity of the oil.

The valve 80 is biased by a spring 101 to a position in which the port 82 is closed so that normally the position of the valve 80 corresponds with clutch engagement. The valve 80 is coupled to a rod 102 which is actuated by mechanism illustrated in Fig. 4.

Referring to Figs. 1, 4, and 5 at the top of the variable speed gear casing 12 is mounted a gear change lever 105 of the ordinary kind whose lower end is adapted for operating the gear selecting mechanism. The lever 105 is fulcrumed at 106 in a support 107 which is rotatable transversely and slidable longitudinally in a housing 108 forming an upward extension of the variable gear casing 12.

In the support 107 is formed a circumferential V shaped groove 109 which engages the upper end of a vertically slidable pin 110 whose lower end engages a pawl 111 mounted on a cross shaft 104 which carries externally a lever 103 coupled to the rod 102. The shaft 104 also carries a pawl 112 which engages a curved tooth 114 mounted on the lower part of the lever 105. The pawl 112 is provided with a projection 113 against one side or other on which the curved tooth 114 normally lies.

The operation of this device is as follows:—

When the lever 105 is moved to effect a change of gear the first effect of this movement is to slide the support 107 longitudinally in the direction of said movement, the lever being prevented from rocking appreciably on its fulcrum 106 by the engagement of the tooth 114 with the flank of the projection 113. The movement of the support 107 by displacing the groove 109 forces the pin 110 downwards against the pawl 111 thereby rocking the shaft 104 and with it the external lever 103 in a clockwise direction.

The rod 102 is thereby pulled to the left in Figs. 1, 2 and 4 and moves the valve 80 against the pressure of the spring 101 to open the port 82 thereby releasing the oil pressure in the cylinder 71 and allowing the spring 27 to disengage the clutch.

The rocking of the shaft 104 raises the pawl 112 so that the tooth 114 can clear the projection 113. Continued movement of the lever 105 now rocks it about its fulcrum 106 to effect the required change of gear. When this movement has been completed and the new gear engaged the lever is released whereupon the support 107 is centralized by the means illustrated in Fig. 5, consisting of a plunger 115 loaded by a spring 116.

The end of the plunger 115 is of conical form and engages the groove 109 so that it acts to urge the support 107 to a central position. The centralizing of the support 107 allows the pin 110 to rise into its normal position in which its upper point rests in the bottom of the groove 109. The raising of the pin 110 allows the elements 104, 103, 111, 112 to rock back into their normal position, the tooth 114 being again engaged with the projection 113.

The curvature of the tooth 114 is struck in an arc from the center of the support 107 so that its engagement with the pawl 112 is not affected by sideways rocking of the gear shift lever 105. Further the projection 113 is shaped so that the tooth 114 can engage with either flank thereof according as the gear shift lever 105 is in a forward or rearward position corresponding to the particular gear selected.

By this means it will be seen that the gear shift lever 105 is not operative to shift the gears until by movement of the support 107, it has operated to disengage the clutch; further the clutch cannot be re-engaged until a gear engagement has been effected since rocking of the pawl 112 in the clutch engaging direction is blocked by the engagement of the tip of projection 113 with the tooth 114 except when the lever 105 is in one or other gear engaging position.

The isolating coupling contained in the casing 13 will now be described.

In the form of construction illustrated this is arranged for isolating the variable speed gear when the main clutch is disengaged to facilitate gear-changing and is also provided with control means giving optional free-wheeling.

Referring to Fig. 4 the output shaft 44 issuing from the rear end of the variable gear casing 12 carries the annulus member 117 of a free-wheel coupling of the roller ratchet type, the rollers being indicated at 118 and the driven member at 119. A prolongation of the member 119 constitutes a drum 120 round which is wound a coil spring 121 having one end 122 secured to the member 117, while the other end 123 is secured to a male cone member 124 which is rotatable relatively to the member 117.

The male cone member 124 is engageable by a female cone member 125 slidably but non-rotatably mounted on a shaft 126 secured to the drum member 120. The female cone member 125 carries by means of a bearing 127 a collar 128 which is engaged by a striking fork 130 mounted on a rocking shaft 131.

The female cone 125 is urged to engagement with the male cone 124 by springs 129 acting on the collar 128 and the striking fork 130 is rockable for disengaging the cone members 124, 125 by means of a lever 132 whose shaft carries an external lever having two arms 133, 134.

The engagement of the cone members 124, 125 has the effect of coupling the end 123 of the spring 121 with the driven shaft 126 so that any relative rotation between the shafts 126 and 44 permitted by the free-wheel coupling 117, 118, 119 has the effect of winding the spring 121 on to the drum 120, whereupon the well known self-engaging property of a coil spring and drum clutch comes into operation to bring about tight engagement of the drum and spring, the latter being wound in the appropriate direction to resist relative rotation of the shafts 126 and 44 in the sense permitted by the free-wheel coupling 117, 118, 119. Thus the engagement of the cones 124, 125 renders the isolating coupling bidirectional and locks the free-wheel against overrun.

The employment of a coil spring and drum for locking the free-wheel together with an auxiliary cone coupling for initiating the engagement of the spring on the drum allows of the locking being effected without serious shocks while the cone coupling is only required to carry a torque load sufficient to initiate the engagement of the spring and may, therefore, be kept to small dimensions.

Operation of the lever 133, 134 to disengage the coupling 124, 125 is effected by a lever 135 to which is coupled one end of a rod 136 whose other end is coupled to an arm 89 secured to the clutch actuating cam 21, 22. On movement of the cam to disengage the clutch the lever 135 is rocked clockwise and the lever arm 133 is pressed in an anti-clockwise direction to actuate lever 132 and striking fork 130 to disengage the coupling 124, 125 so that whenever the main clutch is disengaged the free-wheel device 117, 118, 119 is unlocked to permit overrunning of the driven road wheels which are connected to shaft 126 through the propeller shaft 14 and the usual universal joint 146.

The overrunning clutch 117, 118, 119 then serves in conjunction with the main clutch to isolate the variable speed gear and facilitate gear-changing. On re-engaging the main clutch the coupling 124, 125 is re-engaged by its springs 129 to lock the free-wheel coupling and restore bidirectional drive between the variable speed gear and the driven road wheels.

For obtaining permanent free-wheeling at the option of the driver a knob 141 mounted on the dash board 69 controls a flexible cable connection 139 which actuates a pawl 137 through a spring connection 140. Pawl 137 has a hook-shaped end adapted to engage the end of lever arm 134 and hold it in position for disengaging the coupling 124, 125. The pawl is biased to engaging position by a spring 138 but can only engage when arm 134 is in coupling disengaging position, its hooked end being at other times blocked by the end of arm 134.

When the knob 141 is pulled out the spring 140 is compressed and overcomes spring 138 thus biasing the pawl 137 to disengagement from lever arm 134. This position corresponds to "fixed" drive, the free-wheel coupling only becoming unlocked for overrun when the main clutch is disengaged. Since in the absence of relieving pressure by the lever 135 on the lever arm 133 the pressure of the coupling engaging springs 129 exerts a locking action on the pawl 137, which action is either positive or frictional according as the hooked end of pawl 137 is or is not undercut, the effect of pulling out knob 141 is to compress spring 140, which only acts to release the pawl 137 from the lever arm 134 on subsequently disengaging the main clutch momentarily to engage the lever 135 with the arm 133 and relieve the said locking action.

To revert to "free-wheel" drive knob 141 is pushed in whereupon the pressure of spring 140 is released, pawl 137 being returned to engagement with arm 134 as soon as the latter is rocked into coupling disengaging position by a further disengagement of the main clutch.

In this way the knob control 141 is preselective in both directions requiring a disengagement of the main clutch for its action to become effective. This gives an important advantage in eliminating shock on the coupling 124, 125 and more particularly in preventing the engagement of the spring and drum coupling 121, 120 under load. By this means locking of the free-wheel can only take place concurrently with the engagement of the main clutch, thus eliminating shocks.

To provide for locking of the free-wheel when engaging reverse gear even if the knob control 141 is in "free-wheeling" position a flexible cable connection 88 is established between pawl 137 and the reverse gear selecting means of the variable speed gear. On engaging reverse gear the cable 88 is pulled to disengage pawl 137 from arm 134 to release the latter for return to coupling engaging position. Since the main clutch will normally be disengaged on engaging reverse gear there will be no locking action between pawl 137 and arm 134 and hence no yielding means need be incorporated in cable control 88.

By adopting optional fixed drive by use of the knob control 141 the braking effect of the motor may be utilized. If it should happen that during the declutching necessary for making effective the action of the pre-selective knob control 141 the motor speed falls sufficiently to disengage the main clutch by the action of the centrifugal governor it is only necessary to speed up the motor slightly to effect re-engagement after which the main clutch will remain engaged as long as the vehicle keeps the motor turning faster than the speed at which the centrifugal governor disengages the clutch. In general this speed will be slow and the utility of motor-braking is inconsiderable at slow motor speeds. In descending hills in a low gear the motor will generally be kept turning well above the clutch disengaging speed.

The detail construction of the variable speed gear may be of any suitable known form. In Fig. 6 a specific form is illustrated having automatic gear-synchronizing means and offering certain advantages in combination with the clutch controlling means and other features of this invention.

With the form of variable speed gear illustrated easy gear-changing can be effected in conjunction with the gear-shift lever-controlled power-operated clutch of the present invention without the use of isolating coupling means between the variable speed gear and the driven road wheels as exemplified in the drawings by the elements contained in housing 13.

These coupling means and the control means therefor are however preferably retained even when the variable speed gear is of the kind illustrated in Fig. 6, in order to obtain optional free-wheeling in the manner hereinbefore described.

Referring to Fig. 6; the gear trains for top gear (direct drive) and the next highest gear ratio are shown.

The driven shaft 43 of the main clutch comprises an externally toothed wheel 41 and an internally toothed wheel 42 (located within the variable speed gear housing 12) and a recess in which is housed the spigot end of a splined shaft 44 which forms the output shaft of the variable speed gear and has loosely mounted thereon an externally toothed wheel 45 and an internally toothed wheel 46. The externally toothed wheels 41, 45 are in constant mesh with externally toothed wheels 47, 48 formed integrally on a layshaft 49.

Slidably mounted on the splined part of shaft 44 is a splined sleeve 50 having externally toothed wheels 51, 52 adapted to engage respectively with the internally toothed wheels 42, 46 and comprising also a circumferential groove 53.

The internally toothed wheels 42, 46 have formed on their outer surfaces male cones 57, 58 adapted to engage with corresponding female cones on a sleeve 59 slotted longitudinally at 60 to receive a lug 61 of a ring 62 engaging with the groove 53 of the splined sleeve 50 and having a spring loaded detent 63 adapted to engage a notch 64 in the inner face of the sleeve 59. The lug 61 is bolted to an outer sleeve 65 slidable on sleeve 59 and having a groove 66 engaging a selector finger 54. The selector finger 54 is carried by a slidable member 55 engaged by the lower end of the gear-shift lever 105.

When the selector finger is moved from the neutral position it carries with it the sleeve 65, ring 62 and sleeve 50.

The ring 62 by means of the detent 63 and notch 64 moves the sleeve 59 until one of its female cones engages the corresponding male cone 57 or 58, whose frictional engagement thus brings its rotational speed into synchronism with that of the sleeve 59, the splined sleeve 50 and hence of the shaft 44. Further movement of the selector finger brings into engagement silently and without shock the pair of externally and internally toothed wheels 51, 42 or 52, 46 corresponding to the male cone 57 or 58 engaged by the coned sleeve 59, the detent 63 slipping out of engagement with the notch 64 to allow the further movement of the sleeve 50. On bringing the selector finger 54 back to the neutral position the detent 63 and notch 64 re-engage.

The variable speed gear will usually include three or more speeds and a reverse gear. The gear trains for the lower speeds are not illustrated herein but may be provided with automatic synchronizing means similar to those shown for the two higher speeds, and the construction of the reverse gear means may follow the usual automobile engineering practice and is therefore not illustrated.

By the means of the present invention the advantages of easy gear-changing, elimination of foot operation of the clutch, selective free-wheeling and motor-braking are thus secured in a novel and effective manner, together with elimination of extra controls for reversing, while the foot operation of the clutch may be reverted to when required and the motor may be started through the clutch by the inertia of the vehicle after a stall or by pushing the vehicle in the manner commonly utilized for a first start in cold weather.

What I claim is:—

1. In an automobile, a motor, a clutch, clutch-operating power means, a variable speed gear and gear-changing means, together with means actuated by the operation of said gear-changing means for controlling the clutch-operating power means to bring about disengagement of the clutch during changes of gear and clutch controlling means responsive to the motor speed to bring about clutch disengagement when the motor is decelerated below a selected speed.

2. In an automobile, the combination with a motor and driven road wheels, of a variable speed gear, a clutch disposed between the motor and the variable speed gear, power means for operating said clutch, gear-changing means, means actuated by the operation of said last named means for controlling said power means to bring about disengagement of said clutch during changes of gear, and a free-wheel device operative between the variable speed gear and the driven road wheels and serving in conjunction with the power operated clutch to isolate the variable speed gear to facilitate gear-changing.

3. In an automobile, the combination with a motor and driven road wheels, of a variable speed gear, a clutch disposed between the motor and the variable speed gear, power means for operating said clutch, gear-changing means, means actuated by said last named means for controlling said power means to bring about disengagement of said clutch during changes of gear, a free-wheel device operative between the variable speed gear and the driven road wheels and serving in conjunction with the power operated clutch to isolate the variable speed gear to facilitate gear-changing and means for locking the free-wheel device and rendering it inoperative.

4. In an automobile, the combination with a motor and driven road wheels, of a variable speed gear, a clutch disposed between the motor and the variable speed gear, power means for operating said clutch, gear-changing means, means actuated by said last named means for controlling said power means to bring about disengagement of said clutch during changes of gear, and a free-wheel device operative between the variable speed gear and the driven road wheels and serving in conjunction with the power operated clutch to isolate the variable speed gear to facilitate gear-changing, together with independently controlled means for locking the free-wheel device to suppress its operation for the purpose of utilizing the braking effect of the motor.

5. In an automobile, the combination with a motor and driven road wheels, of a variable speed gear, a clutch disposed between the motor and the variable speed gear, power means for operating said clutch, gear-changing means, means actuated by said last named means for controlling said power means to bring about disengagement of said clutch during changes of gear, a free-wheel device operative between the variable speed gear and the driven road wheels and serving in conjunction with the power operated clutch to isolate the variable speed gear to facilitate gear-changing and means actuated by the gear-changing means for locking the free-wheel when reverse gear is engaged.

6. In an automobile, a clutch, a variable speed gear of the silent-engaging type, gear-changing means, power means for operating said clutch and means actuated by the operation of said gear-changing means for controlling said power means to bring about disengagement of the clutch during changes of gear, a motor, and clutch controlling means responsive to the motor speed to bring about clutch disengagement when the motor is decelerated below a selected speed.

7. In an automobile, a clutch, a variable speed gear, gear-changing means, power means for operating said clutch and means actuated by the operation of said gear-changing means for controlling said power means to bring about disengagement of the clutch during changes of gear, a motor, and clutch controlling means responsive to the motor speed to bring about clutch disengagement when the motor is idling and progressive engagement of the clutch when the motor speed exceeds a predetermined value.

8. In an automobile, the combination with a motor and driven road wheels of a variable speed gear, a clutch disposed between the motor and the variable speed gear, a free-wheel device operative between the variable speed gear and the driven road wheels and serving in conjunction with the clutch to isolate the variable speed gear to facilitate gear-changing, free-wheel locking means, means actuated by the operation of said clutch for controlling said free-wheel locking means to lock said free-wheel device against overrun when the clutch is engaged and release it for free overrun when the clutch is disengaged and means for optionally retaining said free-wheel locking means in free-wheel releasing relation to permit continued overrun of the driven road wheels, preselective means controlling said retaining means and having alternative positions for "fixed" and "free-wheel" drive respectively and means operative to make effective a preselected change from one to the other of the said alternative drives on disengagement of the clutch.

9. In an automobile, the combination with a motor and driven road wheels of a variable speed gear, a clutch disposed between the motor and the variable speed gear, a free-wheel device operative between the variable speed gear and the driven road wheels and serving in conjunction with the clutch to isolate the variable speed gear to facilitate gear-changing, and means actuated by the operation of said clutch for locking the free-wheel device against overrun while the clutch is engaged, together with gear-changing means, a power device for operating the clutch and means actuated by the operation of said gear-changing means for controlling said power device to bring about disengagement of the clutch during changes of gear.

10. In an automobile, the combination with a motor and driven road wheels of a variable speed gear, a clutch disposed between the motor and the variable speed gear, a free-wheel device operative between the variable speed gear and the driven road wheels and serving in conjunction with the clutch to isolate the variable speed gear to facilitate gear-changing, means for selectively locking the free-wheel device against overrun, means actuated by the disengagement of the clutch for releasing the free-wheel device for free overrun when selectively locked, and means preventing said selective means from becoming operative to lock the free-wheel device except concurrently with the engagement of the clutch.

11. In an automobile, the combination with a motor and driven road wheels of a variable speed gear, a clutch disposed between the motor and the variable speed gear, a free-wheel device operative between the variable speed gear and the driven road wheels and serving in conjunction with the clutch to isolate the variable speed gear to facilitate gear-changing, means for selectively locking the free-wheel device against overrun, means actuated by the disengagement of the clutch for releasing the free-wheel device for free overrun when selectively locked, and means preventing said selective means from becoming operative to lock the free-wheel device except concurrently with the engagement of the clutch, together with gear-changing means, a power device for operating the clutch and means actuated by the operation of said gear-changing means for controlling said power device to bring about disengagement of the clutch during changes of gear.

12. In an automobile, the combination with a motor, a variable speed gear and gear-changing means, of a clutch, a power device operative on said clutch, motor driven centrifugal governor means controlling said power device to bring about clutch-disengagement when the motor is idling and progressive engagement of the clutch when the motor exceeds a predetermined speed and means actuated by the operation of said gear-changing means for controlling said power device to bring about clutch-disengagement during changes of gear.

13. In an automobile, the combination with a motor, a clutch, a variable speed gear and gear-changing means, of power means utilizing a fluid as its working substance and including a cylinder and a clutch-operating piston movable in said cylinder and valve means actuated by the operation of said gear-changing means for controlling the fluid pressure in said cylinder to bring about clutch-disengagement during changes of gear, together with motor driven centrifugal governor means and valve means actuated thereby for controlling the fluid pressure in said cylinder to bring about clutch-disengagement when the motor turns at less than a predetermined speed.

14. In an automobile, the combination with a motor, a clutch, a variable speed gear and gear-changing means, of power means utilizing a fluid as its working substance and including a cylinder and a clutch-operating piston movable in said cylinder and valve means actuated by the operation of said gear-changing means for controlling the fluid pressure in said cylinder to bring about clutch-disengagement during changes of gear, together with motor driven centrifugal governor means, adjustable regulating means therefor and valve means actuated by said governor means for controlling the fluid pressure in said cylinder to bring about clutch-disengagement when the motor turns at less than a speed selectable by adjustment of said regulating means.

15. In an automobile, a clutch, clutch-operating power means, a clutch pedal operable for clutch-disengagement when the said power means is in clutch-engaging relation, a variable speed gear and gear-changing means, means actuated by the operation of said last named means for controlling said power means to disengage the clutch during changes of gear, means preselectively controlled for locking said power means to permit direct pedal operation of the clutch, said locking means becoming operative on bringing said power means into clutch-engaging relation, and means actuated by fully depressing the clutch pedal for bringing said power means into clutch-engaging relation to effect the locking thereof.

16. In an automobile, a clutch, power means for operating said clutch, a variable speed gear, a movable support, a gear-changing member fulcrumed in said support, gear selecting elements actuated by said gear-changing member, control means for said power means actuated by movement of said support from its normal position to bring about clutch-disengagement, means normally restraining said gear-changing member from actuating said selecting elements, said last named means being actuated by said control means, concurrently with the disengagement of the clutch, to release said gear-changing member for actuation of said selecting elements, and means for restoring said movable support to normal position on release of said gear-changing member to bring about re-engagement of the clutch and re-establish restraint of said gear-changing member after a change of gear has been effected.

17. In an automobile including a clutch, power means for operating said clutch and a variable speed gear, a gear-changing member, a movable fulcrum member pivotally supporting said gear-changing member and displaceable by manipulation thereof, a control connection between said fulcrum member and said power means operative to disengage the clutch on displacement of said fulcrum member in either direction from a neutral position and means biasing said fulcrum member to neutral position; means restraining the gear-changing member against gear-changing movement, while the fulcrum member is in neutral position and retaining the control connection of the clutch operating power means in clutch disengaging position except when the gear-changing member is in one of its gear-engaging positions.

18. In an automobile including a clutch, power operating means therefor and a variable speed gear, a slidable fulcrum member spring biased to a neutral position between two limits of travel, a gear-shift lever pivotally mounted thereon, a control connection with said power means actuable by displacement of said fulcrum member in either direction from the neutral position to disengage the clutch and a locking member actuated by said control connection and engaging a part of the gear-shift lever to restrain the latter against pivotal movement on the fulcrum member except when the control connection is in clutch disengaging position and to retain the control connection in clutch disengaging position as long as the gear-shift lever is in neutral position.

19. In an automobile, a motor, a clutch and power means for operating said clutch including a movable clutch operating member, a source of pressure fluid, such as a pump, giving continuous delivery, a delivery conduit giving permanent free communication between said source and said member, a controllable relief valve in said conduit and control means for said valve responsive to motor speed to effect disengagement of the clutch below a selected motor speed.

20. In an automobile, a motor, a clutch and power means for operating said clutch, including a cylinder, a clutch operating member therein, a motor driven oil pump, a delivery connection giving constant free communication between pump and cylinder, a controllable relief valve communicating with the cylinder and means responsive to motor speed for controlling said relief valve to bring about clutch disengagement below a selected motor speed.

21. In an automobile, a motor, a clutch and power means for operating said clutch including a cylinder, a clutch operating member therein, a motor driven oil pump, a delivery connection giving constant free communication between pump and cylinder, a controllable relief valve communicating with the cylinder and centrifugal governor means for controlling said relief valve to bring about clutch disengagement below a selected motor speed.

22. In an automobile, a motor, a clutch and power means for operating said clutch including a cylinder, a clutch operating member therein, a motor driven oil pump, a delivery connection giving constant free communication between pump and cylinder, a controllable relief valve communicating with the cylinder, relief port means opened by the clutch operating member at the end of its power stroke to release excess oil from the cylinder, and means responsive to motor speed for controlling said relief valve to bring about clutch disengagement below a selected motor speed.

23. In an automobile, a motor, a clutch and power means for operating said clutch including a cylinder, a clutch operating member therein, a motor driven oil pump, a delivery connection giving constant free communication between pump and cylinder, a controllable relief valve communicating with the cylinder and centrifugal governor means for controlling said relief valve to bring about clutch disengagement below a selected motor speed, said controllable relief valve being of the "pressure-balanced" type to ensure equality of loading on the centrifugal governor in opening and closing the valve.

24. In an automobile, a motor, a clutch, clutch controlling means external to the clutch and responsive to motor speed for disengaging the clutch below a selected motor speed, a clutch pedal overriding said clutch controlling means, clutch pedal actuated means for disabling said clutch controlling means and preselectively controlled means for holding said clutch controlling means disabled.

25. In an automobile, a motor, a clutch, clutch engaging spring means, clutch disengaging spring means overriding the engaging spring means, centrifugal means operative when the motor exceeds a selected speed to overcome the disengaging spring means and permit the engaging spring means to engage the clutch, a clutch pedal, means actuated by depression of the clutch pedal for overcoming and thereby bringing out of action the disengaging spring means and preselectively controlled means for holding the disengaging spring means out of action.

26. In an automobile, a clutch, clutch-operating power-means, a variable speed gear, a manually operated gear-changing member, means actuated by displacement of said gear-changing member for controlling the clutch-operating power means so as compulsorily to bring about disengagement of the clutch during changes of gear, a clutch pedal and means independently controlled for selectively suppressing the action of the power means and holding them in clutch-engaging relation and so as to permit the clutch to be directly operated by the pedal in the usual way at the option of the driver.

27. In an automobile, a clutch, power means for operating said clutch, a variable speed gear, a gear-changing member, a movable fulcrum therefor displaceable by manipulation of said gear-changing member, control means for said power means actuated by displacement of said fulcrum from its neutral position to bring about clutch disengagement on initiating a change of gear and means for automatically restoring said support to neutral position on release of said gear-changing member to bring about re-engagement of the clutch after a change of gear has been effected.

28. In an automobile, a clutch, clutch-operating power means, a clutch pedal operable for clutch disengagement when the said power means is in clutch-engaging relation, a variable speed gear and gear-changing means, means actuated by displacement of said last named means for controlling said power means to disengage the clutch compulsorily during changes of gear and independently controlled means for locking said power means in clutch-engaging relation to permit direct operation of the clutch by the pedal in the usual way at the option of the driver.

29. In an automobile, a motor, a clutch, clutch-operating power means, a variable speed gear, gear-changing means, means associated with said gear-changing means for controlling the clutch-operating power means to bring about disengagement of the clutch during changes of gear, a driven member adapted to be driven by said variable speed gear, and a free wheel device between said variable speed gear and said driven member acting in conjunction with the disengagement of the clutch to isolate the variable speed gear during changes of gear.

EDWARD HENRY JAMES CECIL GILLETT.

DISCLAIMER 2,087,643.—*Edward Henry James Cecil Gillett*, West Hampstead, London, England. AUTOMOBILE TRANSMISSION AND CONTROL SYSTEM. Patent dated July 20, 1937. Disclaimer filed January 20, 1939, by the assignee, *Reduction Gears, Limited;* the licensee, *Borg-Warner Corporation*, approving.

Hereby enters this disclaimer to claim 2 in said patent.

[*Official Gazette February 14, 1939.*]

a cylinder, a clutch operating member therein, a motor driven oil pump, a delivery connection giving constant free communication between pump and cylinder, a controllable relief valve communicating with the cylinder, relief port means opened by the clutch operating member at the end of its power stroke to release excess oil from the cylinder, and means responsive to motor speed for controlling said relief valve to bring about clutch disengagement below a selected motor speed.

23. In an automobile, a motor, a clutch and power means for operating said clutch including a cylinder, a clutch operating member therein, a motor driven oil pump, a delivery connection giving constant free communication between pump and cylinder, a controllable relief valve communicating with the cylinder and centrifugal governor means for controlling said relief valve to bring about clutch disengagement below a selected motor speed, said controllable relief valve being of the "pressure-balanced" type to ensure equality of loading on the centrifugal governor in opening and closing the valve.

24. In an automobile, a motor, a clutch, clutch controlling means external to the clutch and responsive to motor speed for disengaging the clutch below a selected motor speed, a clutch pedal overriding said clutch controlling means, clutch pedal actuated means for disabling said clutch controlling means and preselectively controlled means for holding said clutch controlling means disabled.

25. In an automobile, a motor, a clutch, clutch engaging spring means, clutch disengaging spring means overriding the engaging spring means, centrifugal means operative when the motor exceeds a selected speed to overcome the disengaging spring means and permit the engaging spring means to engage the clutch, a clutch pedal, means actuated by depression of the clutch pedal for overcoming and thereby bringing out of action the disengaging spring means and preselectively controlled means for holding the disengaging spring means out of action.

26. In an automobile, a clutch, clutch-operating power-means, a variable speed gear, a manually operated gear-changing member, means actuated by displacement of said gear-changing member for controlling the clutch-operating power means so as compulsorily to bring about disengagement of the clutch during changes of gear, a clutch pedal and means independently controlled for selectively suppressing the action of the power means and holding them in clutch-engaging relation and so as to permit the clutch to be directly operated by the pedal in the usual way at the option of the driver.

27. In an automobile, a clutch, power means for operating said clutch, a variable speed gear, a gear-changing member, a movable fulcrum therefor displaceable by manipulation of said gear-changing member, control means for said power means actuated by displacement of said fulcrum from its neutral position to bring about clutch disengagement on initiating a change of gear and means for automatically restoring said support to neutral position on release of said gear-changing member to bring about re-engagement of the clutch after a change of gear has been effected.

28. In an automobile, a clutch, clutch-operating power means, a clutch pedal operable for clutch disengagement when the said power means is in clutch-engaging relation, a variable speed gear and gear-changing means, means actuated by displacement of said last named means for controlling said power means to disengage the clutch compulsorily during changes of gear and independently controlled means for locking said power means in clutch-engaging relation to permit direct operation of the clutch by the pedal in the usual way at the option of the driver.

29. In an automobile, a motor, a clutch, clutch-operating power means, a variable speed gear, gear-changing means, means associated with said gear-changing means for controlling the clutch-operating power means to bring about disengagement of the clutch during changes of gear, a driven member adapted to be driven by said variable speed gear, and a free wheel device between said variable speed gear and said driven member acting in conjunction with the disengagement of the clutch to isolate the variable speed gear during changes of gear.

EDWARD HENRY JAMES CECIL GILLETT.

DISCLAIMER 2,087,643.—*Edward Henry James Cecil Gillett*, West Hampstead, London, England. AUTOMOBILE TRANSMISSION AND CONTROL SYSTEM. Patent dated July 20, 1937. Disclaimer filed January 20, 1939, by the assignee, *Reduction Gears, Limited;* the licensee, *Borg-Warner Corporation*, approving.

Hereby enters this disclaimer to claim 2 in said patent.

[*Official Gazette February 14, 1939.*]

DISCLAIMER 2,087,643.—*Edward Henry James Cecil Gillett*, West Hampstead, London, England. AUTOMOBILE TRANSMISSION AND CONTROL SYSTEM. Patent dated July 20, 1937. Disclaimer filed January 20, 1939, by the assignee, *Reduction Gears, Limited;* the licensee, *Borg-Warner Corporation*, approving.

Hereby enters this disclaimer to claim 2 in said patent.

[*Official Gazette February 14, 1939.*]